United States Patent
Shirokobrod

(10) Patent No.: US 11,898,973 B2
(45) Date of Patent: Feb. 13, 2024

(54) XFR ANALYZER INSTRUMENT

(71) Applicant: HITACHI HIGH-TECH ANALYTICAL SCIENCE FINLAND OY, Espoo (FI)

(72) Inventor: Oleg Shirokobrod, Vantaa (FI)

(73) Assignee: HITACHI HIGH-TECH ANALYTICAL SCIENCE FINLAND OY, Espoo (FI)

( * ) Notice: Subject to any disclaimer, the term of this patent is extended or adjusted under 35 U.S.C. 154(b) by 101 days.

(21) Appl. No.: 17/728,244

(22) Filed: Apr. 25, 2022

(65) Prior Publication Data

US 2022/0349845 A1  Nov. 3, 2022

(30) Foreign Application Priority Data

Apr. 26, 2021  (EP) .................................... 21170386

(51) Int. Cl.
*G01N 23/223* (2006.01)

(52) U.S. Cl.
CPC ..... *G01N 23/223* (2013.01); *G01N 2223/076* (2013.01)

(58) Field of Classification Search
CPC ........................ G01N 23/223; G01N 2223/076
See application file for complete search history.

(56) References Cited

U.S. PATENT DOCUMENTS

| | | | |
|---|---|---|---|
| 10,175,184 B2 | 1/2019 | Creighton et al. | |
| 2005/0011351 A1 | 1/2005 | Park et al. | |
| 2007/0269003 A1* | 11/2007 | Puusaari | G01N 23/223 378/44 |
| 2015/0177167 A1 | 6/2015 | Tanaka et al. | |

FOREIGN PATENT DOCUMENTS

EP  2096431 A1 *  9/2009  ........... G01N 23/223

OTHER PUBLICATIONS

Akiyama, WO 2020/066100 A1 with English translation, (2020). (Year: 2020).*
European Search Report for EP21170386 dated Sep. 25, 2021, 2 pages.

* cited by examiner

*Primary Examiner* — Chih-Cheng Kao
(74) *Attorney, Agent, or Firm* — NIXON & VANDERHYE

(57) ABSTRACT

Disclosed is an X-ray fluorescence analyzer instrument for analyzing the elemental composition of a sample, including: a measurement chamber including air and a measurement aperture sealed by a sample window; a radiation source inside the measurement chamber to invoke secondary radiation from the sample adjacent to the sample window exterior of the measurement chamber; a radiation detector having its receiver inside the measurement chamber, the radiation detector receiving the secondary radiation from the sample window and providing a measurement signal describing intensity of the received radiation; a controller analyzing composition of the sample based on an energy spectrum of the measurement signal based on a calibration established at a reference air density inside the measurement chamber; and a device adjusting a volume of the measurement chamber restoring the reference air density inside the measurement chamber after a change in air density inside the measurement chamber to maintain calibration validity.

20 Claims, 3 Drawing Sheets

200

Operate an XRF analyzer instrument for analysis of elemental composition of samples with the measurement chamber thereof including air at a reference air density
202

Obtain an indication regarding a change in the air density inside the measurement chamber from the reference air density to a redefined air density
204

Control a volume adjustment assembly coupled to the measurement chamber to adjust a volume of the measurement chamber such that the air density inside the measurement chamber is brought from the redefined air density to a value that is within the predefined margin from the reference air density
206

Figure 4

XFR ANALYZER INSTRUMENT

This application claims priority to EP 21170386.3 filed Apr. 26, 2021, the entire contents of which are hereby incorporated by reference.

TECHNICAL FIELD

The example and non-limiting embodiments of the present invention relate to X-ray fluorescence (XRF) analysis and, in particular, to a calibration of a XRF analyzer instrument.

BACKGROUND

The XRF analysis is a technique that enables analysis of elemental composition of various materials, such as metals, glass, etc. The XRF analysis relies on energy spectrum of fluorescent (secondary) X-rays generated via exciting a sample under study using a high-energy (primary) X-rays: each element emits fluorescent X-rays exhibiting an energy spectrum that is characteristic to the respective element when subjected to the high-energy X-rays and, consequently, elemental composition of a sample may be determined via analysis of the energy spectrum of the fluorescent X-rays invoked by directing the high-energy X-rays to the sample.

Hence, an XRF analyzer instrument comprises an X-ray radiation source such as an X-ray tube for exciting a sample under study using the high-energy X-rays, a solid-state detector such as a silicon drift detector (SDD) for capturing the fluorescent X-rays invoked from the sample by the high-energy X-rays, and an analyzer entity for determining the elemental composition of the sample based on the energy spectrum of the fluorescent X-rays captured by the detector. In this regard, a radiation-emitting portion of the X-ray radiation source and a radiation-receiving surface of the detector are arranged in a closed space that may be referred to as a measurement chamber. The measurement chamber is provided with an aperture, which is closed by a sample window to prevent dust and small particles from entering the measurement chamber but that allows for the high-energy X-rays to exit the measurement chamber to excite a sample positioned immediately adjacent to the sample window and that allows the fluorescent X-rays invoked from the sample to enter the measurement chamber and meet the radiation-receiving surface of the detector therein. The analyzer entity may be communicatively coupled to the detector (e.g. via one or more electrical wires) and it may be provided outside the measurement chamber.

Both the high-energy X-rays and the fluorescent X-rays are subject to absorption that takes place in the measurement chamber and, consequently, reliable and accurate XRF analysis requires precise calibration of the XRF analyzer instrument such that it accounts for conditions in the measurement chamber. In particular, the absorption of both the high-energy X-rays and the fluorescent X-rays that occurs in an air path within the measurement chamber is strongly dependent on air density within the measurement chamber. Previously known solutions in this regard include providing the measurement chamber as a vacuum or as space filled with a gaseous substance such as helium that does not substantially absorb the X-rays, thereby providing the measurement chamber as one having substantially known X-ray absorption characteristics. Regardless of the manner of providing the measurement chamber, the XRF analyzer instrument needs to be carefully calibrated to ensure accurate and reliable analysis in view of characteristics of the measurement chamber. In this regard, two basic approaches are available, i.e. so-called fundamental parameters (FP) calibration and an empirical calibration, which are briefly discussed in the following.

The FP calibration relies on modeling X-ray interactions inside the measurement chamber and with the sample based on a priori knowledge of the energy spectrum of the high-energy X-rays emitted from the X-ray radiation source and respective intensities of fluorescence lines for a plurality of elements. This information enables calculating the respective absorptions occurring for the high-energy X-rays and for the respective fluorescence lines in the measurement chamber for the plurality of elements and, consequently, computing respective absorption corrections to be applied (e.g. by the analyzer entity) in the course of operation of the XRF analyzer instrument.

The empirical calibration, on the other hand, relies on using the measurement chamber for analyzing a high number of samples having a priori known characteristics with respect their elemental composition and mathematical modeling of corresponding measured fluorescence lines. Additional modeling may be applied to estimate the absorption affecting the fluorescence lines in the measurement chamber due to atmosphere therein and, consequently, using the estimated absorption to derive an absorption correction to be applied (e.g. by the analysis entity) in the course of the XRF analyzer instrument. However, such absorption correction does not account for the energy spectrum of the high-energy X-rays emitted from the X-ray radiation source and therefore does not enable isolating the absorption of the high-intensity X-rays occurring in the measurement chamber, which may make the absorption correction less than optimal and even risk instability of the calibration.

Despite its above-discussed shortcoming, the empirical calibration of the XRF analyzer instrument is also a tempting option since it provides a proven approach that does not require detailed a priori knowledge of respective characteristics of components arranged in the measurement chamber while it is able to directly account for any 'environmental' factors within the measurement chamber that may affect the absorption therein but that may be difficult to capture in the modeling applied in the FP calibration. On the other hand, carrying out the empirical calibration is a laborious task that requires time and resources and it needs to be carried out in strictly controlled circumstances, typically in a laboratory or in a factory. Moreover, any changes in characteristics of the measurement chamber that may occur during the lifecycle of the XRF analyzer instrument typically results in an unknown change in the absorption characteristics and, consequently, typically require repeating the calibration procedure in its entirety to re-establish the calibration in order to continue providing reliable measurement results.

SUMMARY

It is an object of the present invention to provide an approach that enables maintaining and/or re-establishing calibration of a XRF analyzer instrument regardless of occurrence of changes that affect characteristics of a measurement chamber of the XRF analyzer instrument.

According to an example embodiment, an X-ray fluorescence (XRF) analyzer instrument for analysis of elemental composition of a sample is provided, the XRF analyzer instrument comprising: a hermetically sealed measurement chamber comprising air and provided with a measurement aperture that is sealed by a sample window; a radiation source having its radiation-emitting portion disposed inside the measurement chamber and arranged to emit primary radiation towards the sample window so as to invoke secondary radiation from the sample arranged adjacent to the sample window on exterior of the measurement chamber; a radiation detector having its radiation-receiving portion disposed inside the measurement chamber, the radiation detector arranged to receive the secondary radiation from direction of the sample window and to provide a measurement signal that is descriptive of intensity of the received radiation; a controller arranged to carry out the analysis of elemental composition of the sample on basis of an energy spectrum of the measurement signal in accordance with a calibration established at a reference air density inside the measurement chamber; and a volume adjustment assembly arranged to adjust a volume of the measurement chamber for restoring the reference air density inside the measurement chamber after a change in air density inside the measurement chamber in order to maintain validity of said calibration.

According to another example embodiment, a method is provided, the method comprising: applying an XRF analyzer instrument according to the example embodiment described in the foregoing for analysis of elemental composition with the reference air density inside the measurement chamber; obtaining an indication regarding a change in the air density inside the measurement chamber from the reference air density to a redefined air density; and controlling the volume adjustment assembly to adjust the volume of the measurement chamber such that the air density inside the measurement chamber is brought from the redefined air density to a value that is within a predefined margin from the reference air density.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1 schematically illustrates some components of an XRF analyzer instrument according to an example;

FIG. 4 illustrates a flowchart that represents a method according to an example.

DESCRIPTION OF SOME EMBODIMENTS

Figure 1:
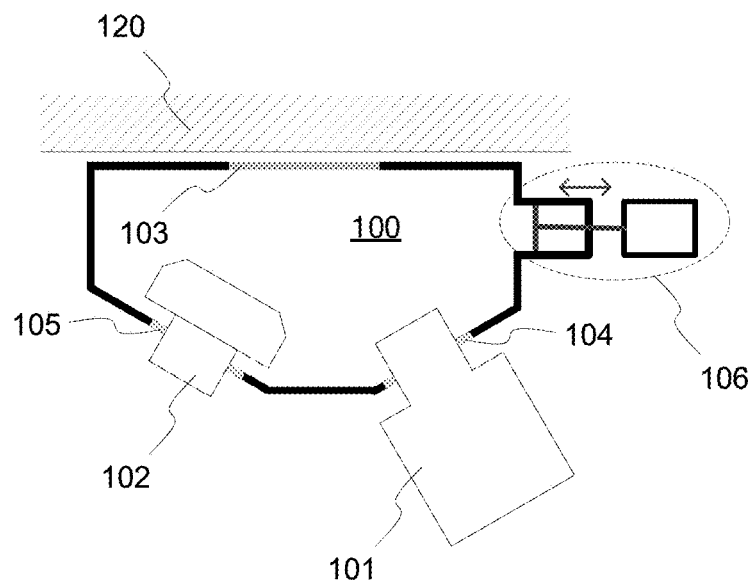
Figure 2:
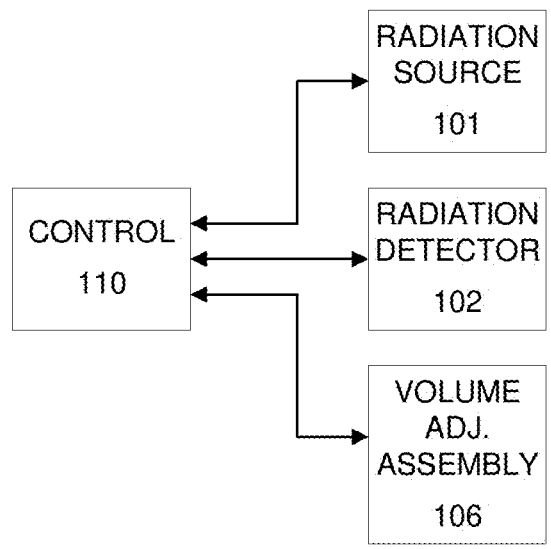
FIG. 2 illustrates a block diagram of some components of an XRF analyzer instrument according to an example.

FIG. 1 schematically illustrates some components of an X-ray fluorescence (XRF) analyzer instrument according to an example, whereas FIG. 2 illustrates a block diagram of some components of the XRF analyzer instrument according to an example. In particular, FIG. 1 schematically illustrates a cross-section of a measurement chamber assembly together with a sample 120 intended for analysis using the XRF analyzer instrument. The measurement chamber assembly comprises a measurement chamber 100 with a radiation source 101 for emitting primary radiation towards the sample 120 and a radiation detector 102 for detecting secondary radiation invoked from the sample 120 due to the primary radiation. Hence, the primary radiation serves as an excitation to invoke the secondary radiation from the sample 120. The radiation source 101 may comprise, for example, an X-ray tube for emitting high-energy X-rays, whereas the secondary radiation invoked by the primary radiation may comprise fluorescent X-rays. The detector 102 may comprise, for example, a solid-state detector such as a silicon drift detector (SDD). The detector 102 may be arranged to provide a measurement signal that is descriptive of intensity of radiation received at the radiation detector 102 and that enables deriving an energy spectrum of the received secondary radiation.

The measurement chamber 100 may provide a hermetically sealed space therein to ensure keeping the conditions within the measurement chamber 100 unchanged over time. The measurement chamber 100 is provided with a measurement aperture, which is hermetically sealed by a sample window 103 that is transparent for both the primary radiation and the secondary radiation. The sample window 103 is typically provided as film or foil, whereas examples of materials suitable for the film or foil serving as the sample window 103 include polymers such as polypropylene and polyamide and silicon nitride. The radiation source 101 is arranged with respect to the measurement chamber 100 such that its radiation-emitting portion is disposed inside the measurement chamber 100 such that the primary radiation emitted therefrom is directed towards the sample window 103 and a radiation-receiving portion of the radiation detector 102 is arranged inside the measurement chamber 100 such that it is able to receive the secondary radiation from direction of the sample window 103. Hence, when carrying out an analysis of the sample 120 by the XRF analyzer instrument, the sample 120 is positioned outside the measurement chamber 100 immediately adjacent to the sample window 103 and, consequently, the primary radiation is directed to the sample 120 through the sample window 103 while the secondary radiation invoked from the sample is directed to the radiation detector 102 likewise through the sample window 103.

As also shown in the schematic illustration of FIG. 1, the radiation source 101 does not typically reside inside measurement chamber 100 in its entirety but it is sufficient to have the radiation-emitting portion thereof disposed inside the measurement chamber 100. Hence, the measurement chamber 100 may be provided with a radiation source aperture for fitting the radiation source 101 to the measurement chamber 100 such that its radiation-emitting portion is disposed within the measurement chamber 100 while part of the radiation source 101 remains outside the measurement chamber 100. In this regard, the radiation-emitting portion of the radiation source 101 may protrude into a space within the measurement chamber 100 through the radiation source aperture via a source adapter 104 that ensures airtight sealing between the radiation source 101 and the measurement chamber 100.

Along similar lines, the radiation detector 102 does not typically reside inside measurement chamber 100 in its entirety but it is sufficient to have the radiation-receiving portion thereof disposed inside the measurement chamber 100. Hence, the measurement chamber 100 may be provided with a radiation detector aperture for fitting the radiation detector 102 to the measurement chamber 100 such that its radiation-receiving portion is disposed within the measurement chamber 100 while part of the radiation detector 102 remains outside the measurement chamber 100. In this regard, the radiation-receiving portion of the radiation detector 102 may protrude into the space within the measurement chamber 100 through the radiation detector aperture via a receiver adapter 105 that ensures airtight sealing between the radiation detector 102 and the measurement chamber 100.

Along the lines described above, the measurement chamber assembly is applicable as a component of a XRF analyzer instrument that is useable for determining an elemental composition of the sample 120. In particular, the XRF analyzer instrument may be applicable for determining elemental composition of samples including materials such as metals, glass, oil, soil, plastic, cement, etc. The measurement chamber assembly is useable in XRF analyzer instruments of different types, e.g. in a handheld or otherwise portable XRF analyzer instrument or in a desktop/benchtop XRF analyzer instrument: in a handheld XRF analyzer instrument the measurement chamber assembly may be arranged in a front end of the instrument such that the sample window 103 may be brought into contact with the sample 120 when analyzing the sample 120, whereas in a benchtop XRF analyzer instrument the measurement chamber assembly may be arranged such that, depending on the design of the benchtop XRF analyzer instrument, the sample 120 may be placed on top of the sample window 103 or under the sample window 103 when carrying out the analysis of the sample 120.

As shown in the block diagram of FIG. 2, the XRF analyzer instrument may further comprise a controller 110 that is communicatively coupled to the radiation source 101 and to the radiation detector 102 and that is arranged for controlling one or more aspects related to operation of the radiation source 101 and the radiation detector 102. As an example in this regard, the controller 110 may enable carrying out the analysis of elemental composition of the sample 120, which analysis may include the controller 110 implementing the following actions:

- control the radiation source 101 to emit the primary radiation of predefined characteristics,
- read the measurement signal from the radiation detector 102,
- carry out the analysis of elemental composition of the sample 120 based at least in part on the measurement signal.

The XRF analyzer instrument may comprise a user interface (UI) including a user input portion for receiving user input for controlling at least some aspects of operation of the XRF analyzer instrument and an output portion for displaying information pertaining to operation of the XRF analyzer instrument. The user input portion may comprise, for example, a touchscreen or a touchpad and/or one more keys, buttons, switches, knobs, etc. for receiving user commands for operating the XRF analyzer instrument, whereas the output portion may comprise, for example, an electronic display (e.g. a touchscreen or a conventional electronic display apparatus) for displaying information pertaining to results of the analysis of elemental composition carried out by the XRF analyzer instrument and/or to operational status of the XRF analyzer instrument. The controller 110 may be arranged to control one or more aspects related to operation of the measurement chamber assembly based at least in part on user input received via the UI of the XRF analyzer instrument. As a non-limiting example in this regard, the controller 110 may be arranged to carry out the analysis of elemental composition of a sample described in the foregoing in response to receiving a respective user command via the UI of the XRF analyzer instrument.

The space within the measurement chamber 100 may comprise air at a known air density, which may be referred to as an initial air density. In this regard, the initial air density may be defined upon manufacturing the measurement chamber 100 for the XRF analyzer instrument: a step of closing the measurement chamber 100 in an airtight manner via installation of the sample window 103 to close the measurement aperture may be carried out in ambient air, thereby setting the initial air density inside the measurement chamber 100 to a value that substantially matches the density of the ambient air upon hermetically sealing the measurement chamber 100.

Having the measurement chamber 100 filled with air at or close to the atmospheric air pressure is advantageous in that pressure difference between the interior and the exterior of the measurement chamber 100 is relatively small (e.g. in comparison to an approach with vacuum inside a measurement chamber) and hence the hermetical sealing of the measurement chamber 100 does not require usage of highest-quality (and hence expensive) adapters 104, 105 for ensuring airtight sealing or special circumstances for sealing the measurement chamber 100. Moreover, the usage of ambient air in the measurement chamber 100 enables a straightforward manufacturing and/or configuration of the measurement chamber 100 since there is no need to fill the measurement chamber with gaseous substance of specific composition or to create vacuum therein.

In an example, the air density inside the measurement chamber 100 may be assumed to remain at the value that substantially matches the initial air density, i.e. the ambient air density upon sealing the measurement chamber 100 and, consequently, the initial air density may serve as a reference air density. The initial air density may be determined, for example, by measuring an ambient air pressure and an ambient temperature upon sealing the measurement chamber 100 and determining the initial air density via the ambient air pressure and the ambient temperature (e.g. via the ratio of the ambient air pressure to the ambient temperature). In this regard, the XRF analyzer instrument may comprise respective sensors for measuring the ambient air pressure and the ambient temperature and, consequently, the controller 110 may use these sensors to capture an initial air pressure and an initial air temperature upon sealing the measurement chamber 100 and use these parameters, respectively, as a reference air pressure and a reference air temperature. The reference air pressure and reference air temperature so obtained may be applied to define the information that specifies the reference air density, and the controller 110 may store this information in the memory provided therein for subsequent use. The controller 110 may capture and store these parameters, for example, in response to a respective command received via the UI of the XRF analyzer instrument. In another example, the information that specifies the reference air density may be provided to the controller 110 as user input via the UI of the XRF analyzer instrument.

In a further example, there may be air diffusion to or from the measurement chamber 100 between sealing thereof and the calibration procedure, which may change the air density inside the measurement chamber 100 from the initial air density that substantially matches to the ambient air density upon sealing the measurement chamber 100 to another value. Alternatively, the air temperature inside the measurement chamber 100 may change due to changes in ambient conditions or due to conduction via the measurement chamber 100 itself. To account for a such a scenario, in an example, the measurement chamber 100 may comprise a pressure sensor 107 for measuring air pressure inside the measurement chamber 100 and a temperature sensor 108 for measuring temperature inside the measurement chamber 100. Consequently, the controller 110 may use these sensors to capture an air pressure and an air temperature inside the measurement chamber 100 upon calibrating the XRF analyzer instrument, use these parameters, respectively, as the reference air pressure and the reference air temperature, apply the reference air pressure and the reference air temperature so obtained as the information that specifies the reference air density, and store this information in the memory provided in the controller 110 for subsequent use. The controller 110 may capture and store these parameters, for example, in response to a respective command received via the UI of the XRF analyzer instrument.

Upon configuring the XRF analyzer instrument for operating measurement chamber assembly, the controller 110 may need to be calibrated to carry out the analysis of elemental composition in accordance with characteristics of the measurement chamber assembly in order to ensure correct and reliable analysis in view of characteristics of the measurement chamber 100, such as absorption of one or more fluorescence lines pertaining to a certain element due to other elements in the sample 120 (so called matrix effect) and absorption of the primary and secondary radiation occurring in their respective airpaths within the measurement chamber 100. In this regard, aspects that have an effect on the absorption include respective distances from the radiation source 101 to the sample window 103 and from the sample window 103 to the radiation detector 102 as well as the air density inside the measurement chamber 101, while the absorption is typically different for different elements and different combinations of elements.

The calibration carried out for a newly-manufactured XRF analyzer instrument upon configuring it for use may be referred to as initial calibration. The initial calibration serves to establish calibration at the reference air density inside the measurement chamber 100 and in subsequent operation of the XRF analyzer instrument the controller 110 may carry out the analysis of elemental composition of the sample 120 in accordance with the initial calibration established at the reference air density. In an example, the initial calibration may involve carrying out a calibration procedure that implements the empirical calibration described in the foregoing and it may result in deriving a calibration model that accounts for at least some aspects of absorption occurring in the measurement chamber 100 at the reference air density. As a non-limiting example in this regard, the calibration procedure may rely on calibration data including a plurality of predefined reference samples having respective a priori known elemental compositions. In this regard, elemental composition of each reference sample may be characterized via one or more elements included in the respective reference sample and their respective concentrations therein.

The calibration procedure may comprise e.g. the following steps:
- use the measurement chamber assembly to obtain a respective measurement signal for each of the plurality of reference samples,
- determine a respective measured energy spectra for each of the plurality of reference samples based on the measurement signal obtained therefor; and
- derive the calibration model based on the respective measured energy spectra determined for the plurality of reference samples and the respective concentrations of one or more elements in the plurality of reference samples.

In other words, the calibration procedure results in determining the calibration model that serves to match the measured energy spectra to the respective a priori known elemental compositions of the a priori known reference samples when the air inside the measurement chamber 100 is at the reference air density.

As an example in this regard, the calibration data may include K reference samples $S_k$ and, for each sample $S_k$, a priori knowledge of respective reference concentrations $c_{ref,k}(n)$ of N predefined elements in the respective reference sample, whereas determination of the measured energy spectra in the course of the calibration procedure may result in obtaining the respective intensities $I_k(m)$ for M fluorescence lines in the energy spectrum measured for the sample $S_k$. Herein, the reference concentrations $c_{ref,k}(n)$ are non-zero only for those elements that are actually included in the respective reference sample $S_k$ and the measured intensities $I_k(m)$ may be non-zero only for those fluorescence lines that are characteristics of the elements included in the sample $S_k$.

As an example, the calibration model may be provided as a set of calibration equations that define the relationship between the reference concentrations $c_{ref,k}(n)$ and the intensities $I_k(m)$ of the measured energy spectrum of the reference sample $S_k$ via calibration coefficients $R(n,m)$ as follows:

$$c_{ref,k}(1) = R(1, 1) \cdot I_k(1) + R(1, 2) \cdot I_k(2) + \ldots + R(1, M) \cdot I_k(M)$$

$$c_{ref,k}(2) = R(2, 1) \cdot I_k(1) + R(2, 2) \cdot I_k(2) + \ldots + R(2, M) \cdot I_k(M)$$

...

$$c_{ref,k}(n) = R(n, 1) \cdot I_k(1) + R(n, 2) \cdot I_k(2) + \ldots + R(n, M) \cdot I_k(M)$$

...

$$c_{ref,k}(N) = R(N, 1) \cdot I_k(1) + R(N, 2) \cdot I_k(2) + \ldots + R(N, M) \cdot I_k(M)$$

Hence, the calibration procedure may involve finding respective values of the calibration coefficients $R(n,m)$ in the calibration equations such that one or more predefined error criteria over the K reference samples $S_k$ is minimized. As an example in this regard, the calibration procedure may comprise application of a regression analysis technique known in the art to define the calibration coefficients $R(n,m)$ that model (e.g. define) the conversion from the respective intensities $I_x(m)$ of the M predefined fluorescence lines of a measured energy spectrum to the respective concentrations $c_x(n)$ of the N predefined elements as $$c_x(1) = R(1, 1) \cdot I_x(1) + R(1, 2) \cdot I_x(2) + \ldots + R(1, M) \cdot I_x(M)$$

$$c_x(2) = R(2, 1) \cdot I_x(1) + R(2, 2) \cdot I_x(2) + \ldots + R(2, M) \cdot I_x(M)$$

...

$$c_x(n) = R(n, 1) \cdot I_x(1) + R(n, 2) \cdot I_x(2) + \ldots + R(n, M) \cdot I_x(M)$$

...

$$c_x(N) = R(N, 1) \cdot I_x(1) + R(N, 2) \cdot I_x(2) + \ldots + R(N, M) \cdot I_x(M).$$

In another example, the calibration procedure may comprise application of a machine learning technique known in the art to derive the calibration model as a calibration function that models (e.g. defines) the conversion from the respective intensities $I_x(m)$ of the M predefined fluorescence lines of the measured energy spectra to the respective concentrations $c_x(n)$ of the N predefined elements. As an example of such an approach, the calibration function may comprise an artificial neural network (ANN), whose weights are defined via supervised learning carried out using the respective intensities $I_k(m)$ of the M fluorescence lines in the energy spectrum measured for the K reference samples $S_k$ and the respective reference concentrations $c_{ref}(n)$ of the N predefined elements in the K reference samples $S_k$ as the training data.

Consequently, the derived calibration model represents the outcome of the initial calibration and it may be stored in a memory provided in the controller 110, whereas in subsequent operation of the XRF analyzer instrument the controller 110 may carry out the analysis of elemental composition of the sample 120 in accordance with the derived model, thereby accounting for any absorption occurring in the measurement chamber 100 at the reference air density. In this regard, the calibration model may be applied in the analysis of the sample 120 such that respective intensities $I_x(m)$ for M fluorescence lines in the energy spectrum measured for the sample 120 are converted into the respective concentrations of the N predefined elements. With the calibration model configured using the calibration data, such conversion results in substantially non-zero concentrations $c_x(n)$ for those ones of the N predefined elements that are included in the sample 120 and substantially zero-valued concentrations $c_x(n)$ for those ones of the N predefined elements that are not included in the sample 120.

The initial calibration is carried out with the air inside the measurement chamber 100 having the reference air density described in the foregoing and, consequently, the calibration model obtained via the initial calibration serves to compensate for absorption characteristics of the measurement chamber 100 at the reference air density. In this regard, the memory in the controller 110 may further store information that specifies the reference air density. In an example, this information may comprise an indication of the actual reference air density as such, whereas in another example the information that specifies the reference air density may comprise one or more parameters that enable deriving the reference air density, such as respective indications of the reference air pressure and the reference air temperature. In a further example, the information that specifies the reference air density may comprise an indication of a ratio between the reference air pressure and the reference air temperature, e.g. the ratio of the reference air pressure to the reference air temperature (which may correspond to the reference air density multiplied by the specific gas constant $R_{specific}$).

The XRF analyzer instrument may further comprise a volume adjustment assembly 106 for adjusting of the volume of the measurement chamber 100 in order to adjust air density inside the measurement chamber 100. Due to hermetical sealing of the measurement chamber 100, a change in its volume results in an immediate change in the air pressure inside the measurement chamber 100 (while also the air temperature therein may change to a smaller degree), thereby resulting in a change in the air density inside the measurement chamber 100. A particular example of application of the volume adjustment assembly 106 is restoration of the reference air density inside the measurement chamber 100 after a change in the air density therein. While the hermetic sealing of the measurement chamber 100 guarantees that in normal operation of the XRF analyzer device the air density inside the measurement chamber 100 remains at the reference air density, the air density therein may change e.g. in case the hermetic sealing of the measurement chamber 100 is broken and subsequently restored, which may occur for example as a result of re-sealing of the measurement chamber 100 via replacement of a broken or damaged sample window 103 with a new one. Other scenarios that involve a change in the air density inside the measurement chamber 100 may change include e.g. air diffusion to or from the measurement chamber 100, slow leakage to ambient air due to minor damage occurring to the measurement chamber 100, or a change in the air temperature inside the measurement chamber 100.

In this regard, the changed air density may be referred to as a redefined air density inside the measurement chamber 100 and it may result in absorption characteristics that are significantly different from those at the reference air density, thereby possibly rendering the calibration established via the initial calibration invalid. Since, as described in the foregoing, the calibration procedure according to the empirical calibration paradigm is a relatively laborious and time-consuming task that needs to be carried out in strictly controlled circumstances e.g. in a laboratory or in a factory, the capability to restore the reference air density inside the measurement chamber 100 and, consequently, render the calibration model obtained via the initial calibration valid, provides an advantage in terms of ensuring correct calibration of the XRF analyzer instrument without the need to carry out the calibration procedure again.

According to an example, the volume adjustment assembly 106 may operate at least partially under control of the controller 110. In this regard, the controller 110 may carry out an air density adjustment that may involve operating the volume adjustment assembly 106 to adjust the volume of the measurement chamber 100 such that the air density inside the measurement chamber 100 is brought from the redefined air density into the reference air density or to a(nother) value that is within a predefined margin from the reference air density. In an example, the controller 110 may proceed with the air density adjustment regardless of the extent of difference between the redefined air density and the reference air density, whereas in another example the controller 110 may proceed with the air density adjustment in response to (the absolute value of) the difference between the redefined air density and the reference air density exceeding a predefined threshold. The air density adjustment may be triggered e.g. via the controller 110 receiving a respective command via the UI of the XRF analyzer instrument.

Along the lines described in the foregoing for the reference air density, the information that specifies the redefined air density may comprise, for example, an indication of the actual redefined air density as such, one or more parameters that enable deriving the redefined air density (e.g. respective indications of a redefined air pressure and a redefined air temperature, or an indication of a ratio between the redefined air pressure and a redefined air temperature, e.g. the ratio of the redefined air pressure to the redefined air temperature). Further along the lines described in the foregoing for the reference air density, in an example, the controller 110 may receive (e.g. upon re-sealing the measurement chamber 100) the redefined air pressure and the redefined air temperature from the respective sensors for measuring the ambient air pressure and the ambient temperature provided in the XRF analyzer instrument upon re-sealing the measurement chamber 100 and use these pieces of information as the information that specifies the redefined air density or derive the information that specifies the redefined air density from the information received from said sensors, whereas in another example the controller 110 may receive the information that specifies the redefined air density as user input via the UI of the XRF analyzer instrument.

In a further example, the controller 110 may receive the redefined air pressure and the redefined air temperature, respectively, from the pressure sensor 107 and the temperature sensor 108 arranged inside the measurement chamber 100 and use these pieces of information as the information that specifies the redefined air density or derive the information that specifies the redefined air density from the information received from the sensors 107, 108. As an example in this regard, the controller 110 may request these pieces of information from the sensors 107, 108 upon or after re-sealing the measurement chamber 100, whereas in another example the controller 110 may request (e.g. periodically or upon carrying out a measurement) a pressure value and a temperature value from the pressure sensor 107 and from the temperature sensor 108 and proceed with the re-calibration in case the air density derived based on the pressure value and the temperature value indicate air density different from the reference air density (as described above).

The information that specifies the redefined air density may be stored in the memory provided in the controller 110 to make it available for the adjustment of the air density inside the measurement chamber 100, which may be carried out based on the respective pieces of information that specify the reference air density and the redefined air density that are available in the memory provided in the controller 110. In this regard, the air density adjustment may be carried out via consideration of a redefined air density value that represents the redefined air density and a reference air density value that represents the reference air density. In an example, the redefined air density value may comprise the redefined air density as such whereas the reference air density value may comprise the reference air density value as such. In another example, the redefined air density value may comprise a ratio between the redefined air pressure and the redefined air temperature, while the reference air density value may comprise a corresponding ratio between the reference air pressure and the reference air temperature.

Figure 3:
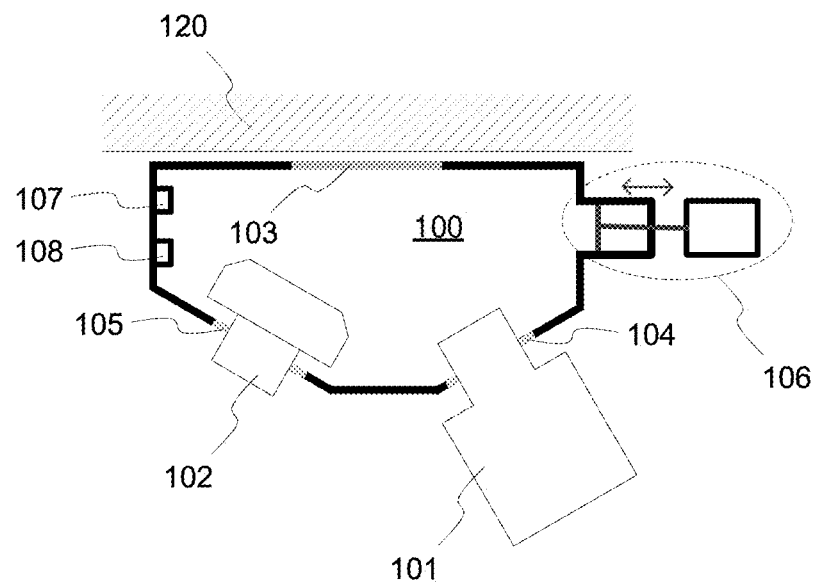
FIG. 3 schematically illustrates some components of an XRF analyzer instrument according to an example.

Referring back to the volume adjustment assembly 106, it may be applicable for adjusting the air density inside the measurement chamber 100 via selectively increasing or decreasing the volume of the measurement chamber 100 at least partially under control of the controller 110. The volume adjustment assembly 106 may enable adjusting the volume of the measurement chamber 100 between predefined minimum and maximum volumes. According to an example, the volume adjustment assembly 106 may comprise a moveable element, whose position defines the volume of the measurement chamber 100. As an example in this regard, the moveable element may comprise a (substantially rigid) moveable wall arranged in a recess within the measurement chamber 100, where the position of the moveable wall with respect to the recess may be adjusted via operation of an actuator coupled thereto, e.g. a piston arranged in a cylindrical recess within the measurement chamber 100, where the piston is moveable via operation of an actuator coupled thereto (as schematically shown in the respective examples of FIGS. 1 and 3). In another example, the moveable element may comprise a flexible membrane arranged in a wall of the measurement chamber 100 whose position, and hence the volume of the space within the measurement chamber 100, may be changed via operation of an actuator coupled thereto. In a further example, the moveable element may comprise a bellows assembly arranged in a wall of the measurement chamber 100, where the bellows assembly may be retracted or extracted to adjust the volume of the measurement chamber 100 accordingly via operation of an actuator coupled thereto.

Consequently, the adjustment of the air density inside the measurement chamber 100 may comprise the controller 110 obtaining the redefined air density value and the reference air density value, determining a change in the volume of the measurement chamber 100 required for a change from the redefined air density value to an air density value that is within a predefined margin from the reference air density value, and controlling the volume adjustment assembly 106 to adjust the volume of the measurement chamber 100 by the determined amount. In this regard, the change in the volume of the measurement chamber 100 required to implement the required change in the air density value may be determined via a predefined mapping between an amount of change in the air density value and a corresponding amount of change in the volume of the measurement chamber 100, where the mapping may be defined e.g. via a predefined mapping function stored in the memory provided in the controller 110. In this regard, the mapping function may be derived via experimental data obtained upon manufacturing the measurement chamber 100 and/or the XRF analyzer instrument.

In this regard, the mapping may concern a mapping from an amount of change in the applicable air density value to a corresponding amount of change in the volume of the measurement chamber 100. In case the volume adjustment assembly 106 comprises the moveable wall that is moveable via operation of the actuator coupled thereto, the air density adjustment may involve determining an amount of movement of the moveable wall required for a change from the redefined air density value to a value that is within a predefined margin from the reference air density value and controlling the actuator to move the moveable wall by the determined amount. In such an example, the mapping described in the foregoing may concern a mapping from an amount of change in the applicable air density value to a corresponding amount of movement of the moveable wall.

As a non-limiting example, some aspects pertaining to the XRF analyzer instrument described in the present disclosure may be operated in accordance with a method 200 that is illustrated by the flowchart depicted in FIG. 4. The method 200 commences from operating the XRF analyzer instrument for analysis of elemental composition of samples with the measurement chamber 100 at the reference air density, as indicated in block 202. Hence, the calibration established at the reference air density via the initial calibration described in the following remains valid in the course of operations pertaining to block 202. The method 200 further comprises obtaining an indication regarding a change in the air density inside the measurement chamber 100 from the reference air density to the redefined air density, as indicated in block 204. In this regard, the change of air density inside the measurement chamber 100 may be e.g. a consequence of re-sealing of the measurement chamber 100 via replacement of a broken or damaged sample window 103 with a new one, as described in the foregoing.

The method 200 further comprises controlling the volume adjustment entity 106 to adjust the volume of the measurement chamber 100 such that the air density inside the measurement chamber 100 is brought from the redefined air density to a value that is within the predefined margin from the reference air density, as indicated in block 206, thereby re-calibration the XRF analyzer instrument. Along the lines described in the foregoing, the re-calibration may comprise application of the volume adjustment assembly 106 to one of increase or decrease the volume of the measurement chamber 100 in order to change the air density therein in a desired manner. The respective operations described with references to blocks 202 to 206 pertaining to the method 200 may be varied or complemented in a number of ways, for example as described in the foregoing and/or in the following with references to the characteristics and/or operation of the XRF analyzer instrument.

Figure 5:
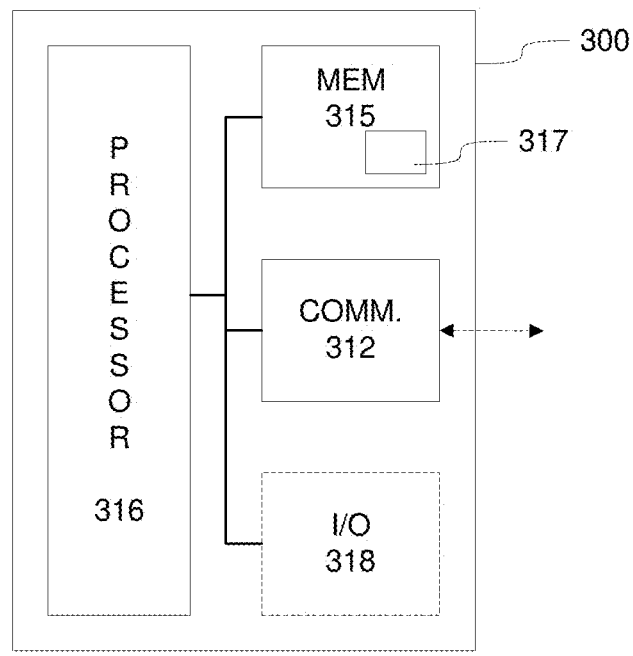
FIG. 5 illustrates a block diagram of some components of an apparatus according to an example.

FIG. 5 illustrates a block diagram of some components of an exemplifying apparatus 300. The apparatus 300 may comprise further components, elements or portions that are not depicted in FIG. 5. The apparatus 300 may be referred to as a computing apparatus and it may be employed e.g. in implementing at least some of the operations, procedures and/or functions described in the foregoing in context of the controller 110. The apparatus 300 comprises a processor 316 and a memory 315 for storing data and computer program code 317. The memory 315 and a portion of the computer program code 317 stored therein may be further arranged to, with the processor 316, to implement at least some of the operations, procedures and/or functions described in the foregoing in context of the controller 110.

The apparatus 300 may comprise a communication portion 312 for communication with other devices. The communication portion 312 comprises at least one communication apparatus that enables wired or wireless communication with other apparatuses. A communication apparatus of the communication portion 312 may also be referred to as a respective communication means. The apparatus 300 may, optionally, further comprise one or more user I/O (input/output) components 318 that may be arranged, possibly together with the processor 316 and a portion of the computer program code 317, to provide the UI of the XRF analyzer instrument. The processor 316 may be arranged to control operation of the apparatus 300 e.g. in accordance with a portion of the computer program code 317 and possibly further in accordance with the user input received via the user I/O components 318 and/or in accordance with information received via the communication portion 312.

Although the processor 316 is depicted as a single component, it may be implemented as one or more separate processing components. Similarly, although the memory 315 is depicted as a single component, it may be implemented as one or more separate components, some or all of which may be integrated/removable and/or may provide permanent/semi-permanent/dynamic/cached storage.

The computer program code 317 stored in the memory 315, may comprise computer-executable instructions that control one or more aspects of operation of the apparatus 300 when loaded into the processor 316. As an example, the computer-executable instructions may be provided as one or more sequences of one or more instructions. The processor 316 is able to load and execute the computer program code 317 by reading the one or more sequences of one or more instructions included therein from the memory 315. The one or more sequences of one or more instructions may be configured to, when executed by the processor 316, cause the apparatus 300 to carry out at least some of the operations, procedures and/or functions described in the foregoing in context of the controller 110.

Hence, the apparatus 300 may comprise at least one processor 316 and at least one memory 315 including the computer program code 317 for one or more programs, the at least one memory 315 and the computer program code 317 configured to, with the at least one processor 316, cause the apparatus 300 to perform at least some of the operations, procedures and/or functions described in the foregoing in context of the controller 110.

The computer programs stored in the memory 315 may be provided e.g. as a respective computer program product comprising at least one computer-readable non-transitory medium having the computer program code 317 stored thereon, the computer program code, when executed by the apparatus 300, causes the apparatus 300 at least to perform at least some of the operations, procedures and/or functions described in the foregoing in context of the controller 110. The computer-readable non-transitory medium may comprise a memory device or a record medium that tangibly embodies the computer program. As another example, the computer program may be provided as a signal configured to reliably transfer the computer program.

References to a processor herein should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

The invention claimed is:

1. An X-ray fluorescence (XRF) analyzer instrument for analysis of elemental composition of a sample, the XRF analyzer instrument comprising:
   a hermetically sealed measurement chamber comprising air and provided with a measurement aperture that is sealed by a sample window;
   a radiation source having its radiation-emitting portion disposed inside the measurement chamber and arranged to emit primary radiation towards the sample window so as to invoke secondary radiation from the sample arranged adjacent to the sample window on an exterior of the measurement chamber;
   a radiation detector having its radiation-receiving portion disposed inside the measurement chamber, the radiation detector arranged to receive the secondary radiation from a direction of the sample window and to provide a measurement signal that is descriptive of intensity of the received radiation;
   a controller arranged to carry out the analysis of elemental composition of the sample on the basis of an energy spectrum of the measurement signal in accordance with a calibration established at a reference air density inside the measurement chamber; and
   a volume adjustment assembly arranged to adjust a volume of the measurement chamber for restoring the reference air density inside the measurement chamber after a change in air density inside the measurement chamber in order to maintain validity of said calibration.

2. The XRF analyzer instrument according to claim 1, wherein the volume adjustment assembly is arranged for adjusting the air density within the measurement chamber via selectively increasing or decreasing volume of the measurement chamber.

3. The XRF analyzer instrument according to claim 2, wherein the volume adjustment assembly comprises a moveable element, whose position with respect to the measurement chamber defines the volume of the measurement chamber.

4. The XRF analyzer instrument according to claim 3, wherein the volume adjustment assembly comprises an actuator arranged to adjust the position of the moveable element and wherein the moveable element comprises one of the following:
   a moveable wall arranged in a recess provided within the measurement chamber, a flexible membrane arranged in a wall of the measurement chamber,
a bellows assembly arranged in a wall of the measurement chamber.

5. The XRF analyzer instrument according to claim 1, wherein the controller is arranged to control the volume adjustment assembly to adjust the volume of the measurement chamber such that the air density inside the measurement chamber is brought from a redefined air density into a value that is within a predefined margin from the reference air density.

6. The XRF analyzer instrument according to claim 2, wherein the controller is arranged to control the volume adjustment assembly to adjust the volume of the measurement chamber such that the air density inside the measurement chamber is brought from a redefined air density into a value that is within a predefined margin from the reference air density.

7. The XRF analyzer instrument according to claim 3, wherein the controller is arranged to control the volume adjustment assembly to adjust the volume of the measurement chamber such that the air density inside the measurement chamber is brought from a redefined air density into a value that is within a predefined margin from the reference air density.

8. The XRF analyzer instrument according to claim 4, wherein the controller is arranged to control the volume adjustment assembly to adjust the volume of the measurement chamber such that the air density inside the measurement chamber is brought from a redefined air density into a value that is within a predefined margin from the reference air density.

9. The XRF analyzer instrument according to claim 5, wherein the controller is arranged to control the volume adjustment assembly to adjust the volume of the measurement chamber in response to a difference between the reference air density and the redefined air density exceeding a predefined threshold.

10. The XRF analyzer instrument according to claim 5, wherein the controller is arranged to:
obtain a redefined air density value that represents the redefined air density and a reference air density value that represents the reference air density;
determine an amount of change in the volume of the measurement chamber required for a change from the redefined air density value to an air density value that is within a predefined margin from the reference air density value; and
control the volume adjustment assembly to adjust the volume of the measurement chamber by the determined amount.

11. The XRF analyzer instrument according to claim 9, wherein the controller is arranged to:
obtain a redefined air density value that represents the redefined air density and a reference air density value that represents the reference air density;
determine an amount of change in the volume of the measurement chamber required for a change from the redefined air density value to an air density value that is within a predefined margin from the reference air density value; and
control the volume adjustment assembly to adjust the volume of the measurement chamber by the determined amount.

12. The XRF analyzer instrument according to claim 10, wherein the controller is arranged to determine the amount of change in the volume of the measurement chamber via a predefined mapping function that defines a mapping between an amount of change in the air density inside the measurement chamber and the amount of change in the volume of the measurement chamber.

13. The XRF analyzer instrument according to claim 5, wherein one of the following applies:
a redefined air density value comprises the redefined air density a reference air density value comprises the reference air density,
the redefined air density value comprise a ratio between a redefined air pressure and a redefined air temperature and the reference air density value comprises a corresponding ratio between a reference air pressure and a reference air temperature.

14. The XRF analyzer instrument according to claim 9, wherein one of the following applies:
a redefined air density value comprises the redefined air density a reference air density value comprises the reference air density,
the redefined air density value comprise a ratio between a redefined air pressure and a redefined air temperature and the reference air density value comprise a corresponding ratio between a reference air pressure and a reference air temperature.

15. The XRF analyzer instrument according to claim 10, wherein one of the following applies:
the redefined air density value comprises the redefined air density and the reference air density value comprises the reference air density,
the redefined air density value comprise a ratio between a redefined air pressure and a redefined air temperature and the reference air density value comprises a corresponding ratio between a reference air pressure and a reference air temperature.

16. The XRF analyzer instrument according to claim 12, wherein one of the following applies:
the redefined air density value comprises the redefined air density and the reference air density value comprises the reference air density,
the redefined air density value comprise a ratio between a redefined air pressure and a redefined air temperature and the reference air density value comprises a corresponding ratio between a reference air pressure and a reference air temperature.

17. The XRF analyzer instrument according to claim 1, wherein said calibration is defined via a calibration model to be applied to the energy spectrum of the measurement signal in the course of the analysis of elemental composition of the sample, wherein the calibration model represents at least one characteristics of the arrangement of the measurement chamber, the radiation source and the radiation detector with the air inside the measurement chamber at the reference air density.

18. The XRF analyzer instrument according to claim 17, wherein said calibration model is derived via an empirical calibration procedure that comprises:
using the arrangement of the measurement chamber, the radiation source and the radiation detector with the air inside the measurement chamber at the reference air density to obtain a respective measurement signal for each of a plurality of predefined reference samples,
determining a respective measured energy spectra for each of the plurality of predefined reference samples based on the measurement signal obtained therefor, and
deriving the calibration model based on the respective measured energy spectra determined for the plurality of predefined reference samples and respective predefined concentrations of one or more elements in the plurality of predefined reference samples.

19. A method comprising:
applying an XRF analyzer instrument according to claim 1 for analysis of elemental composition with the reference air density inside the measurement chamber;
obtaining an indication regarding a change in the air density inside the measurement chamber from the reference air density to a redefined air density; and
controlling the volume adjustment assembly to adjust the volume of the measurement chamber such that the air density inside the measurement chamber is brought from the redefined air density to a value that is within a predefined margin from the reference air density.

20. The method according to claim 19, further comprising carrying out an empirical calibration procedure before applying the XRF analyzer instrument for the analysis of elemental composition in order to establish said calibration, wherein the empirical calibration comprises the following:
using the arrangement of the measurement chamber, the radiation source and the radiation detector with the air inside the measurement chamber at the reference air density to obtain a respective measurement signal for each of a plurality of predefined reference samples,
determining a respective measured energy spectra for each of the plurality of predefined reference samples based on the measurement signal obtained therefor, and
deriving the calibration model based on the respective measured energy spectra determined for the plurality of predefined reference samples and respective predefined concentrations of one or more elements in the plurality of predefined reference samples.

\* \* \* \* \*